US010201027B2

(12) United States Patent
Qiu et al.

(10) Patent No.: US 10,201,027 B2
(45) Date of Patent: Feb. 5, 2019

(54) APPARATUS FOR REPORTING CONNECTION SETUP REQUEST

(71) Applicant: FUJITSU CONNECTED TECHNOLOGIES LIMITED, Kawasaki-shi, Kanagawa (JP)

(72) Inventors: Tao Qiu, Beijing (CN); Lianhai Wu, Beijing (CN); Ningjuan Chang, Beijing (CN); Haibo Xu, Beijing (CN); Weiwei Wang, Beijing (CN); Yanling Lu, Beijing (CN)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 212 days.

(21) Appl. No.: 14/716,217

(22) Filed: May 19, 2015

(65) Prior Publication Data

US 2015/0250014 A1 Sep. 3, 2015

Related U.S. Application Data

(63) Continuation of application No. PCT/CN2012/085430, filed on Nov. 28, 2012.

(51) Int. Cl.
*H04W 4/00* (2018.01)
*H04W 76/14* (2018.01)

(52) U.S. Cl.
CPC ............ *H04W 76/14* (2018.02); *Y02D 70/00* (2018.01); *Y02D 70/21* (2018.01)

(58) Field of Classification Search
CPC . H04W 76/023; H04W 76/02; H04W 76/046; H04W 72/0406; H04W 8/005; H04W 88/02; H04W 88/08; H04L 5/0048; H04L 41/0806
See application file for complete search history.

(56) References Cited

U.S. PATENT DOCUMENTS

2007/0171910 A1 7/2007 Kumar
2008/0310378 A1 12/2008 Kitazoe et al.
(Continued)

FOREIGN PATENT DOCUMENTS

CN 101772199 A 7/2010
CN 101960886 A 1/2011
(Continued)

OTHER PUBLICATIONS

Notice of Preliminary Rejection issued by the Korean Intellectual Property Office for corresponding Korean Patent Application No. 10-2015-7015719, dated May 18, 2016, with English translation.
(Continued)

*Primary Examiner* — Yemane Mesfin
*Assistant Examiner* — Abdelillah Elmejjarmi
(74) *Attorney, Agent, or Firm* — Myers Wolin, LLC

(57) ABSTRACT

An apparatus for reporting connection setup request, includes a request transmitting unit configured to transmit a connection setup request for device-to-device communication to a network side when it is determined according to pre-obtained configuration information that the connection setup request for device-to-device communication can be transmitted to the network side.

2 Claims, 9 Drawing Sheets

(56) References Cited

U.S. PATENT DOCUMENTS

| | | | |
|---|---|---|---|
| 2010/0011110 A1* | 1/2010 | Doppler | H04W 76/023 709/228 |
| 2010/0069067 A1 | 3/2010 | Vanderveen et al. | |
| 2010/0112980 A1 | 5/2010 | Horn et al. | |
| 2010/0203865 A1 | 8/2010 | Horn et al. | |
| 2010/0208698 A1 | 8/2010 | Lu et al. | |
| 2010/0260096 A1 | 10/2010 | Ulupinar et al. | |
| 2011/0098020 A1 | 4/2011 | Van Loon et al. | |
| 2011/0258313 A1 | 10/2011 | Mallik et al. | |
| 2011/0287758 A1* | 11/2011 | Aoyagi | H04W 48/12 455/422.1 |
| 2012/0057474 A1 | 3/2012 | Hirano et al. | |
| 2012/0082105 A1 | 4/2012 | Hwang et al. | |
| 2012/0178379 A1* | 7/2012 | Chen | H04W 52/0206 455/68 |
| 2012/0179789 A1 | 7/2012 | Griot et al. | |
| 2012/0243431 A1 | 9/2012 | Chen et al. | |
| 2012/0258744 A1* | 10/2012 | Jiang | H04W 76/12 455/466 |
| 2013/0005377 A1 | 1/2013 | Wang et al. | |
| 2013/0322388 A1 | 12/2013 | Ahn et al. | |
| 2015/0085747 A1* | 3/2015 | Cho | H04W 76/14 370/328 |
| 2015/0087283 A1 | 3/2015 | Isobe et al. | |
| 2015/0223280 A1* | 8/2015 | Morita | H04W 72/04 370/329 |

FOREIGN PATENT DOCUMENTS

| | | |
|---|---|---|
| CN | 102132625 A | 7/2011 |
| CN | 102264052 A | 11/2011 |
| CN | 102792745 A | 11/2012 |
| CN | 102792759 A | 11/2012 |
| EP | 2 475 214 A1 | 7/2012 |
| JP | 2011-508996 A | 3/2011 |
| JP | 2012-524471 A | 10/2012 |
| JP | 2013-223192 A | 10/2013 |
| JP | 2014-506078 A | 3/2014 |
| KR | 10-2012-0074255 A | 7/2012 |
| WO | 2009/076219 A1 | 6/2009 |
| WO | 2010/007205 A1 | 1/2010 |
| WO | 2010/028690 A1 | 3/2010 |
| WO | 2010/120837 A1 | 10/2010 |
| WO | 2011/069295 A1 | 6/2011 |
| WO | 2011/109941 A1 | 9/2011 |
| WO | 2012/091418 A2 | 7/2012 |
| WO | 2012/097075 A2 | 7/2012 |

OTHER PUBLICATIONS

Extended European search report with supplementary European search report and the European search opinion issued by the European Patent Office for corresponding European Patent Application No. 12889361.7, dated Jun. 15, 2016.

ETSI TS 101 761-2 V 1.3.1, "Broadband Radio Access Networks (BRAN); HIPERLAN Type 2; Data Link Control (DLC) Layer; Part 2: Radio Link Control (RLC) sublayer", Jan. 2002.

Written Opinion of the International Searching Authority issued for corresponding International Patent Application No. PCT/CN2012/085430, dated Sep. 5, 2013, with an English translation.

Notice of Final Rejection issued by the Korean Intellectual Property Office for corresponding Korean Patent Application No. 10-2015-7015719, dated Sep. 9, 2016, with English translation.

International Search Report issued for corresponding International Patent Application No. PCT/CN2012/085430, dated Sep. 5, 2013.

Notice of Reason for Rejection issued by the Japan Patent Office for corresponding Japanese Patent Application No. 2015-543235, dated Jul. 12, 2016, with an English translation.

Written Opinion of the International Searching Authority issued for corresponding International Patent Application No. PCT/CN2013/070616, dated Oct. 17, 2013, with an English translation.

Extended European search report, supplementary European search report and the European search opinion for corresponding European patent application No. 13871338.3 dated Jul. 25, 2016.

3GPP TR 22.803 V12.0.0, "3rd Generation Partnership Project, Technical Specification Group Services and System Aspects; Feasibility study for Proximity Services (ProSe) (Release 12)", Dec. 18, 2012.

Notice of Reasons for Rejection issued for corresponding Japanese Patent Application No. 2015-552962 dated Aug. 23, 2016, with an English translation.

International Preliminary Report on Patentability with Written Opinion of the International Searching Authority for corresponding International Patent Application No. PCT/CN2013/070616 dated Jul. 30, 2015 with English translation.

Notice of Preliminary Rejection issued by the Korean Intellectual Property Office for corresponding Korean Patent Application No. 10-2015-7019508, dated Jun. 23, 2016, with English translation.

Non-Final Office Action issued by the United States Patent and Trademark Office for corresponding U.S. Appl. No. 14/755,289, dated Jan. 27, 2017.

International Search Report issued for corresponding International Patent Application No. PCT/CN2013/070616, dated Oct. 17, 2013, with an English translation.

First Notification of Office Action issued by the State Intellectual Property Office of China for corresponding Chinese Patent Application No. 201280077049.6, dated Sep. 13, 2017, with an English translation.

Search Report issued by the State Intellectual Property Office of China for corresponding Chinese Patent Application No. 201280077049.6, dated Sep. 13, 2017, with an English translation.

Notice of Preliminary Rejection issued for corresponding Korean Patent Application No. 10-2017-7006920, dated May 23, 2017, with an English translation.

Second Notification of Office Action issued by the State Intellectual Property Office of China for corresponding Chinese Patent Application No. 201280077049.6, dated Apr. 18, 2018, with an English translation.

* cited by examiner

APPARATUS FOR REPORTING CONNECTION SETUP REQUEST

CROSS REFERENCE TO RELATED APPLICATIONS

This application is a continuation application of International Application PCT/CN2012/085430 filed on Nov. 28, 2012, the entire contents of which are incorporated herein by reference.

TECHNICAL FIELD

The present invention relates to the field of communications, and in particular to a method and apparatus for configuring information, reporting connection setup request and a system.

BACKGROUND ART

Directly communication between devices (UE) is referred to as D2D (device to device) communication. Currently, D2D connection triggered by user equipment (UE) is performed under the control of a network.

In order to achieve D2D connection triggered by UE, a network side first notifies the UE of whether it supports a D2D function, and the UE may initiate a D2D connection setup request as demanded by itself after the UE acquires indication that the network side supports the D2D function. However, there exists no effective method at present to control UE to initiate a D2D connection setup request.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY OF THE INVENTION

As there exists no effective method at present to control UE to initiate a D2D connection setup request, it is resulted that D2D connection setup requests are initiated excessively. An object of the present invention is to provide a method and apparatus for configuring information, reporting connection setup request and a system, so as to avoid that the UE initiates connection setup requests for D2D communication excessively.

According to an aspect of the embodiments of the present invention, there is provided a method for reporting connection setup request, including:

transmitting a connection setup request for device-to-device communication by UE to a network side when the UE determines according to pre-obtained configuration information that the connection setup request for device-to-device communication can be transmitted to the network side.

According to another aspect of the embodiments of the present invention, there is provided a method for reporting connection setup request, including:

receiving a connection setup request for device-to-device communication transmitted by UE, the connection setup request being a connection setup request for device-to-device communication that is transmitted when the UE determines according to pre-obtained configuration information that the connection setup request for device-to-device communication can be transmitted to the network side.

According to still another aspect of the embodiments of the present invention, there is provided an apparatus for reporting connection setup request, including:

a request transmitting unit configured to transmit a connection setup request for device-to-device communication to a network side when it is determined according to pre-obtained configuration information that the connection setup request for device-to-device communication can be transmitted to the network side.

According to still another aspect of the embodiments of the present invention, there is provided UE, including the apparatus for reporting connection setup request as described above.

According to still another aspect of the embodiments of the present invention, there is provided an apparatus for reporting connection setup request, including:

a request receiving unit configured to receive a connection setup request for device-to-device communication transmitted by UE, the connection setup request being a connection setup request for device-to-device communication that is transmitted when the UE determines according to pre-obtained configuration information that the connection setup request for device-to-device communication can be transmitted to the network side.

According to still another aspect of the embodiments of the present invention, there is provided an eNB, including the apparatus as described above.

According to still another aspect of the embodiments of the present invention, there is provided a network system, including the UE and the eNB as described above.

According to still another aspect of the embodiments of the present invention, there is provided an information configuring method, including:

configuring configuration information for UE, the configuration information being used by the UE to determine whether a connection setup request for device-to-device communication can be transmitted to a network side; wherein the configuration information comprises: information on whether the network side supports the UE to report a connection setup request for device-to-device communication; or information on whether the network side supports the UE to report a connection setup request for device-to-device communication and a predetermined time length; or information on whether the network side supports the UE to report a connection setup request for device-to-device communication, a time interval of reporting a connection setup request for device-to-device communication and a maximal number of times of reporting the connection setup request for device-to-device communication within the time interval.

According to still another aspect of the embodiments of the present invention, there is provided an information configuring apparatus, including an information configuring unit configured to configure configuration information for UE, the configuration information being used by the UE to determine whether a connection setup request for device-to-device communication can be transmitted to a network side;

wherein the configuration information comprises: information on whether the network side supports the UE to report a connection setup request for device-to-device communication; or information on whether the network side supports the UE to report a connection setup request for device-to-device communication and a predetermined time length; or information on whether the network side supports the UE to report a connection setup request for device-to-device communication, a time interval of reporting a connection setup request for device-to-device communication and a maximal number of times of reporting the connection setup request for device-to-device communication within the time interval.

According to still another aspect of the embodiments of the present invention, there is provided an eNB, including the information configuring apparatus as described above.

According to still another aspect of the embodiments of the present invention, there is provided a network system, including:

an eNB including the information configuring apparatus as described above; and

UE configured to receive the configuration information notified by the eNB.

According to still another aspect of the embodiments of the present invention, there is provided a computer-readable program, wherein when the program is executed in an apparatus for reporting connection setup request or UE, the program enables a computer to carry out the method for reporting connection setup request as described above in the apparatus for reporting connection setup request or UE.

According to still another aspect of the embodiments of the present invention, there is provided a storage medium in which a computer-readable program is stored, wherein the computer-readable program enables a computer to carry out the method for reporting connection setup request as described above in an apparatus for reporting connection setup request or UE.

According to still another aspect of the embodiments of the present invention, there is provided a computer-readable program, wherein when the program is executed in an apparatus for reporting connection setup request or an eNB, the program enables a computer to carry out the method for reporting connection setup request as described above in the apparatus for reporting connection setup request or the eNB.

According to still another aspect of the embodiments of the present invention, there is provided a storage medium in which a computer-readable program is stored, wherein the computer-readable program enables a computer to carry out the method for reporting connection setup request as described above in an apparatus for reporting connection setup request or an eNB.

According to still another aspect of the embodiments of the present invention, there is provided a computer-readable program, wherein when the program is executed in an information configuring apparatus or an eNB, the program enables a computer to carry out the information configuring method as described above in the information configuring apparatus or the eNB.

According to still another aspect of the embodiments of the present invention, there is provided a storage medium in which a computer-readable program is stored, wherein the computer-readable program enables a computer to carry out the information configuring method as described above in an information configuring apparatus or an eNB.

An advantage of the embodiments of the present invention exists in that the UE determines whether to transmit the connection setup request for D2D communication to a network side according to the configuration information configured by the network side. In this way, it may avoid that the UE initiates connection setup requests for D2D direct communication excessively, and power consumption may be saved.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The foregoing and other features of the embodiments of the present invention shall become more apparent with reference to the drawings and the following description. In the drawings.

DETAILED DESCRIPTION OF THE INVENTION

Various embodiments of the present invention shall be described below with reference to the accompanying drawings. These embodiments are illustrative only, and are not intended to limit the present invention.

In the embodiments of the present invention, the network side configures the UE with configuration information, the configuration information being used to make the UE to determine according to the configuration information whether it can transmit a connection setup request for D2D direction communication to the network side. In this way, it may be avoided that the UE transmit requests excessively, and power consumption may be saved.

In the following description, a connection setup request for D2D direction communication is referred to as a connection setup request for D2D.

In the embodiments of the present invention, the UE transmits the connection setup request for D2D only when the UE determines according to the pre-obtained configuration information that the connection setup request for D2D can be transmitted to the network side. And the network side configures the UE with a resource for D2D connection for the UE according to a current network state after receiving the connection setup request for D2D, and notifies to the UE.

The information configuring method of an embodiment of the present invention shall be described below with reference to the accompanying drawings.

Figure 1:
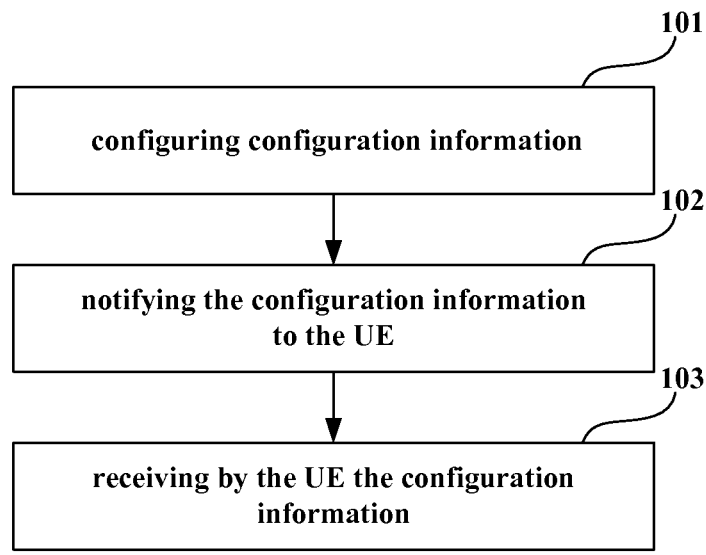
FIG. 1 is a flowchart of an information configuring method of Embodiment 1 of the present invention.

FIG. 1 is a flowchart of an information configuring method of Embodiment 1 of the present invention. At the network side, as shown in FIG. 1, the method includes:

step 101: configuring configuration information;

wherein, the configuration information is used to make the UE to determine whether a connection setup request for D2D can be transmitted to a network side according to the configuration information;

according to different situations, the information configured by the network side for the UE may include: information on whether the network side supports the UE to report a connection setup request for D2D;

or information on whether the network side supports the UE to report a connection setup request for D2D and a predetermined time length;

or information on whether the network side supports the UE to report a connection setup request for D2D, a time interval of reporting a connection setup request for D2D and a maximal number of times of reporting the connection setup request for D2D within the time interval;

step 102: notifying the configuration information to the UE;

wherein, the network side may notify the UE via signaling, and the UE may be notified by a network entity, such as an eNB; a specific manner of notifying may be achieved via broadcast/specific (an L2 or L3 message) signaling; however, it is not limited thereto, and other manners may also be used, which shall not be described herein any further;

at the UE side, step 103 may further be included: receiving by the UE the configuration information notified by the network side.

In this way, the UE may determine whether the connection setup request for D2D can be transmitted to the network side according to the configuration information after obtaining the configuration information.

Figure 2:
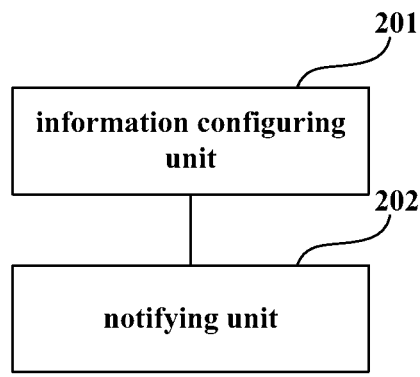
FIG. 2 is a schematic diagram of the structure of an information configuring apparatus of Embodiment 2 of the present invention.

FIG. 2 is a schematic diagram of the structure of an information configuring apparatus of Embodiment 2 of the present invention. At the network side, as shown in FIG. 2, the apparatus 200 includes: an information configuring unit 201 and a notifying unit 202; wherein, the information configuring unit 201 is configured to configure configuration information, the configuration information being used to make the UE to determine whether a connection setup request for D2D can be transmitted to a network side according to the configuration information;

and the notifying unit 202 is configured to notify the configuration information to the UE;

and wherein, the apparatus 200 may notify the UE via signaling, and the apparatus 200 may be a network entity, such as an eNB.

Embodiment 3 of the present invention further provides an eNB, including the information configuring apparatus described in Embodiment 2.

Embodiment 4 of the present invention further provides an information configuring apparatus. At a terminal side, the apparatus may include an information receiving unit (not shown), the information receiving unit being used for receiving the configuration information.

Embodiment 5 of the present invention further provides UE, including the information configuring apparatus described in Embodiment 4. In this way, the UE may determine whether the connection setup request for D2D can be transmitted to the network side according to the configuration information after obtaining the configuration information.

Embodiment 6 of the present invention further provides a network system, including the eNB described in Embodiment 3 and the UE described in Embodiment 5.

The method for reporting connection setup request for D2D of an embodiment of the present invention shall be described below with reference to the accompanying drawings.

Figure 3:
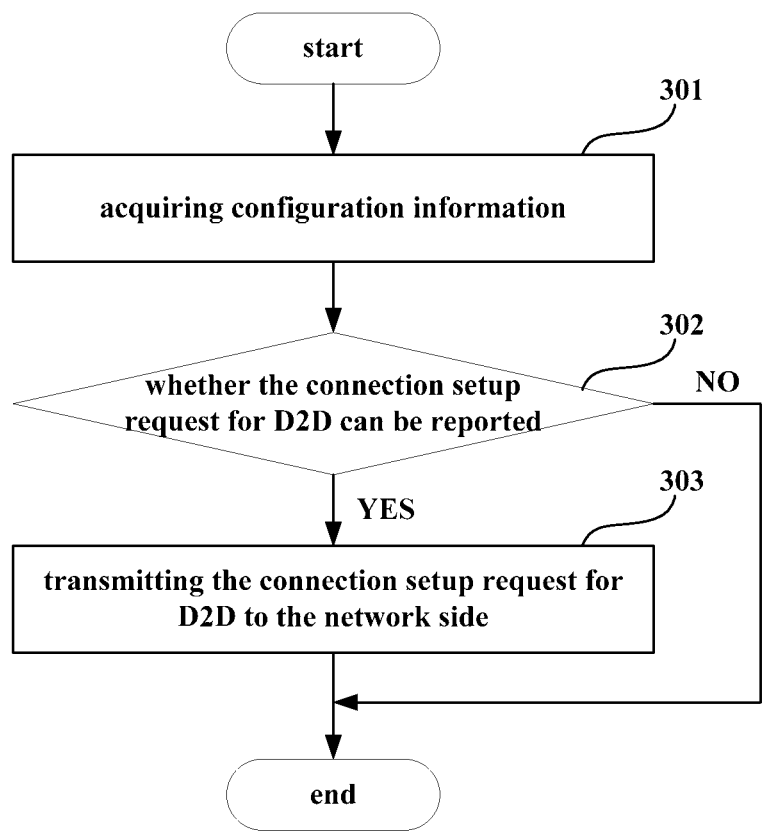
FIG. 3 is a flowchart of reporting a connection setup request for D2D of Embodiment 5 of the present invention.

FIG. 3 is a flowchart of reporting a connection setup request for D2D of Embodiment 7 of the present invention. As shown in FIG. 3, the method includes:

step 301: acquiring configuration information;

in this embodiment, a network side configures the configuration information and notifies to UE via signaling; in this way, the UE may acquire the configuration information;

according to different situations, the information configured may include:

information on whether the network side supports the UE to report a connection setup request for D2D; or information on whether the network side supports the UE to report a connection setup request for D2D and a predetermined time length; or information on whether the network side supports the UE to report a connection setup request for D2D, a time interval of reporting a connection setup request for D2D and a maximal number of times of reporting the connection setup request for D2D within the time interval;

step 302: determining whether the connection setup request for D2D can be reported to the network side according to the configuration information, and executing step 303 when a result of determination is yes; otherwise, terminating the process; and step 303: transmitting the connection setup request for D2D by the UE to the network side when it is determined in step 302 that the connection setup request for device-to-device (D2D) can be transmitted to the network side.

In this embodiment, step 301 is optional, and if the UE pre-obtains the configuration information and stores it in the UE, the UE may directly execute step 302.

It can be seen from the above embodiment that the connection setup request for D2D is transmitted only when the UE determines that the connection setup request for D2D can be transmitted, which may avoid that the UE initiates connection setup requests for D2D excessively, and save power consumption for the UE.

In this embodiment, in step 302, judgment may be performed according to the configuration information, which shall be described below with reference to the accompanying drawings.

In this embodiment, when the configuration information includes information on whether the network side supports the UE to report a connection setup request for D2D, the UE may determine whether the connection setup request for device-to-device (D2D) can be transmitted to the network side according to the configuration information and a situation of whether a connection setup request for D2D has been reported. Wherein, the situation of whether a connection setup request for D2D may be a situation of whether the connection setup request for D2D has been reported, or a situation of whether a content of a connection setup request for D2D is in consistence with that reported previously when the connection setup request for D2D has been reported.

Such a situation shall be described below with reference to FIG. 4.

Figure 4:
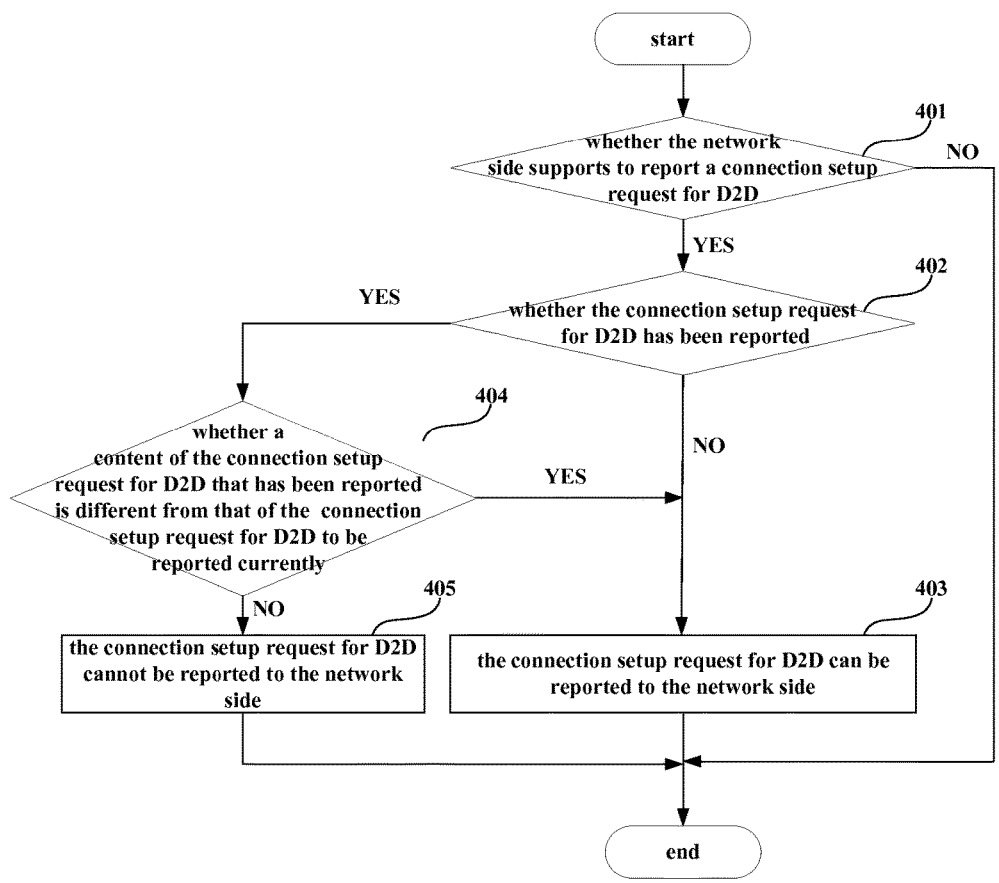
FIGS. 4-6 are flowcharts of a method for determining whether a connection setup request for D2D can be transmitted to the network side of Embodiment 5 of the present invention.

FIG. 4 is a flowchart of a method for determining whether a connection setup request for D2D can be transmitted to the network side of Embodiment 7 of the present invention. As shown in FIG. 4, the method includes:

step 401: determining whether the network side supports the UE to report a connection setup request for D2D;

in this embodiment, in step 401, if a result of determination is yes, step 402 is executed; otherwise, the process is terminated; wherein, if the configuration information is "supporting the UE to report a connection setup request for D2D", it may be determined that the network side supports the UE to report the connection setup request for D2D; otherwise, the network side does not support the UE to report the connection setup request for D2D;

step 402: determining whether the connection setup request for D2D has been reported;

in this embodiment, if the connection setup request for D2D has not been reported, step 403 is executed, so as to determine that the connection setup request for D2D can be reported to the network side; otherwise, step 404 is executed;

step 403: determining that the connection setup request for D2D can be reported to the network side when it is determined in step 402 that the connection setup request for D2D has not been reported;

step 404: determining further whether a content of the connection setup request for D2D that has been reported is different from that of the connection setup request for D2D to be reported currently when it is determined in step 402 that the connection setup request for D2D has been reported;

in this embodiment, when a result of judgment is yes, step 403 is executed; otherwise, step 405 is executed;

step 405: determining not to transmit the connection setup request for D2D to the network side when it is determined in step 404 that the content of the connection setup request for D2D that has been reported is identical to that of the connection setup request for D2D to be reported currently.

Figure 5:
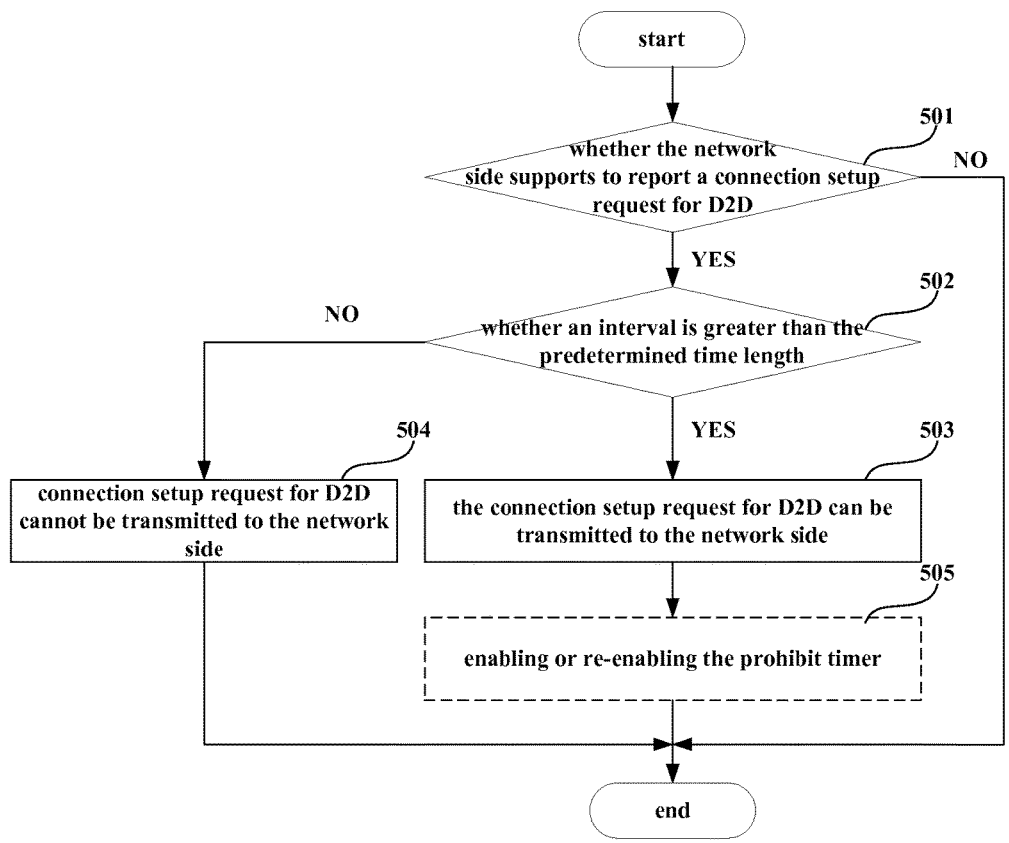

FIG. 5 is a flowchart of a method for determining whether a connection setup request for D2D can be transmitted to the network side of Embodiment 7 of the present invention. When the configuration information includes information on whether the network side supports the UE to report a connection setup request for D2D and a predetermined time length, as shown in FIG. 5, the method includes:

step 501: determining whether the network side supports the UE to report a connection setup request for D2D;

in this embodiment, in step 501, if a result of determination is yes, step 502 is executed; otherwise, the process is terminated; this step is similar to step 401 shown in FIG. 4, and shall not be described herein any further;

step 502: determining whether an interval between a current time and a time of last transmission of the connection setup request is greater than the predetermined time length;

in this embodiment, a prohibit timer may be provided at the UE, and the prohibit timer is started when the UE transmits the connection setup request for D2D; in this way, the UE may mark with "an interval between a current time and a time of last transmission of the connection setup request" according to the prohibit timer; and if timing of the prohibit timer is less than the predetermined time length, it shows that the prohibit timer is started; otherwise, it shows that the prohibit timer is not started;

therefore, judging whether an interval between a current time and a time of last transmission of the connection setup request is greater than the predetermined time length may be: determining whether the prohibit timer is started;

in this embodiment, in step 502, if the time interval is greater than the predetermined time length, that is, a result of judgment is that the prohibit timer is not started, step 503 is executed; otherwise, if the time interval is less than the predetermined time length, that is, a result of judgment is that the prohibit timer is started, step 504 is executed;

step 503: determining that the connection setup request for D2D can be transmitted to the network side;

step 504: determining that the connection setup request for D2D cannot be transmitted to the network side;

step 505: enabling or re-enabling the prohibit timer;

wherein, step 505 is optional.

Figure 6:
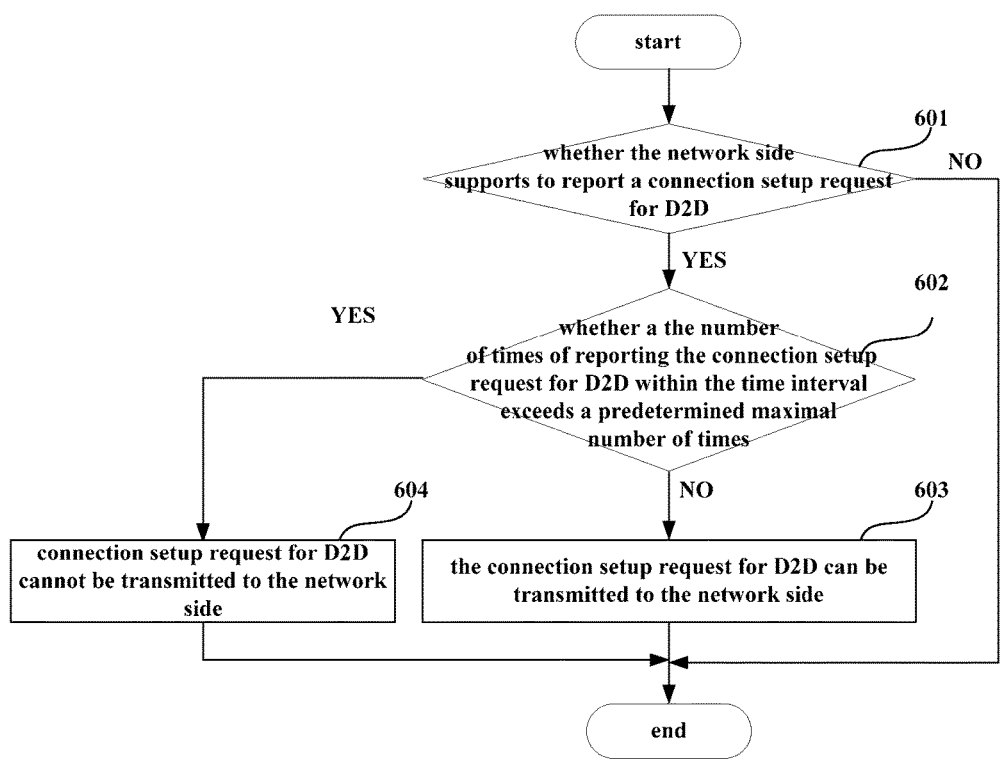

FIG. 6 is a flowchart of a method for determining whether a connection setup request for D2D can be transmitted to the network side of Embodiment 7 of the present invention. When the configuration information includes information on whether the network side supports the UE to report a connection setup request for D2D, a time interval of reporting a connection setup request for D2D and a maximal number of times of reporting the connection setup request for D2D within the time interval, as shown in FIG. 6, the method includes:

step 601: determining whether the network side supports the UE to report a connection setup request for D2D;

in this embodiment, in step 601, if a result of determination is yes, step 402 is executed; otherwise, the process is terminated; this step is similar to step 401 shown in FIG. 4, and shall not be described herein any further;

step 602: determining whether the number of times of reporting the connection setup request for D2D within the time interval exceeds a predetermined maximal number of times;

in this embodiment, if a result of judgment is no in step 602, step 603 is executed; otherwise, step 604 is executed;

step 603: determining that the connection setup request for D2D can be transmitted to the network side when a result of judgment in step 602 is that the predetermined maximal number of times is not exceeded; and step 604: determining that the connection setup request for D2D cannot be transmitted to the network side when a result of judgment in step 602 is that the predetermined maximal number of times is exceeded.

In the above embodiment, as shown in FIG. 3, following step may be included before step 303: setting a content of the connection setup request for D2D.

In the above embodiment, the connection setup request for D2D is transmitted only when it is determined by the UE that the connection setup request for D2D can be transmitted to the network side, thereby avoiding that the UE transmits the request for many times.

Figure 7:
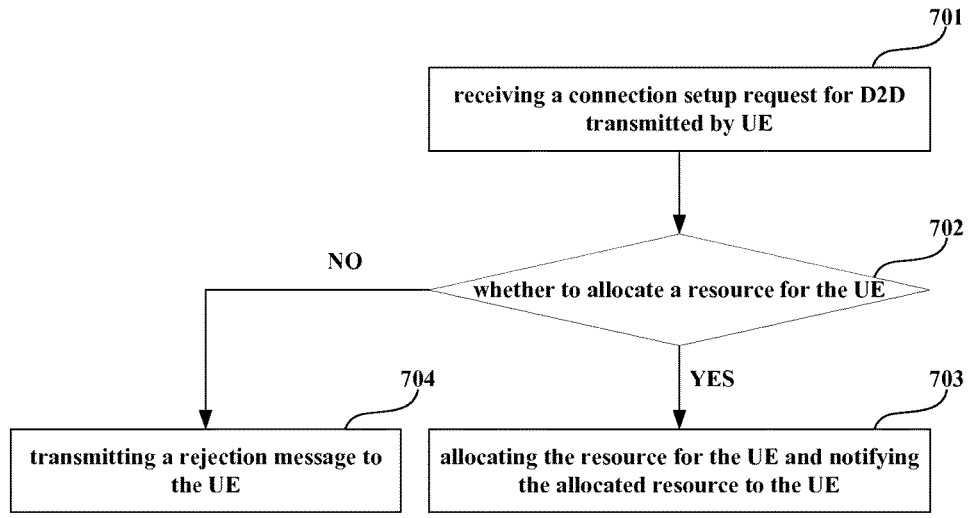
FIG. 7 is a flowchart of a method for reporting a connection setup request for D2D of Embodiment 6 of the present invention.

FIG. 7 is a flowchart of a method for reporting a connection setup request for D2D of Embodiment 8 of the present invention. For a network side, as shown in FIG. 7, the method includes:

step 701: receiving a connection setup request for D2D transmitted by UE;

wherein, the connection setup request for D2D is a connection setup request for D2D transmitted by the UE when the UE determines according to pre-obtained configuration information that the connection setup request for D2D can be transmitted to the network side, a process of determination of the UE being as described in Embodiment 5, which shall not be described herein any further;

step 702: determining according to a current network state whether to allocate a resource for the UE for performing D2D connection;

in this embodiment, when it is determined to allocate the resource for the UE for performing D2D connection, step 703 is executed; otherwise, step 704 is executed;

step 703: allocating the resource for the UE for performing D2D connection, and notifying the allocated resource to the UE; and step 704: transmitting a D2D connection setup rejection message to the UE;

wherein, step 704 is optional.

In this embodiment, before step 701, the method may further include: configuring the UE with configuration information, and notifying the configuration information to the UE; this step is similar to that described in Embodiment 1, which shall not be described herein any further.

Wherein, the configuration information is as described in Embodiment 1, which shall not be described herein any further.

A person of ordinary skill in the art may understand that all or part of the steps in the method carrying out the above embodiments may be carried out by related hardware instructed by a program. The program may be stored in a computer-readable storage medium. And when being executed, the program may include all or part of the steps in the method in the above embodiment, and the storage medium may include an ROM, an RAM, a floppy disc, and a compact disc, etc.

Embodiments of the present invention further provides an apparatus for reporting connection setup request, UE and an eNB, as described in the embodiments below. As the principles of the apparatus for reporting connection setup request, UE and eNB for solving problems are similar to that of the above method based on the apparatus for reporting connection setup request, UE and eNB, the implementation of the method may be referred to for the implementation of the apparatus for reporting connection setup request, UE and eNB, and the repeated parts shall not be described any further.

Embodiment 9 of the present invention provides an apparatus for reporting connection setup request. At a terminal side, the apparatus includes a request transmitting unit configured to transmit a connection setup request for device-to-device (D2D) communication to a network side when it is determined according to pre-obtained configuration information that the connection setup request for D2D can be transmitted to the network side.

Figure 8:
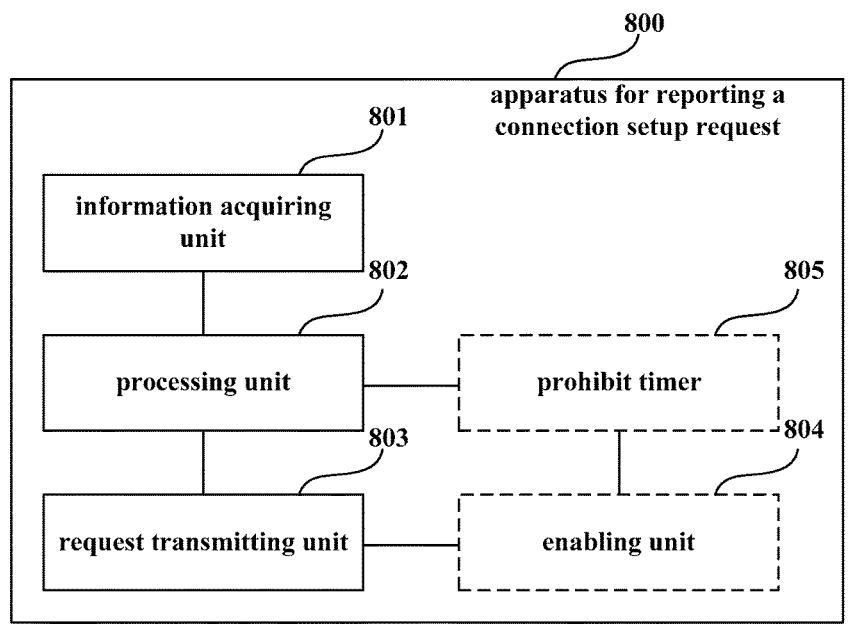
FIG. 8 is a schematic diagram of the structure of an apparatus for reporting a connection setup request for D2D of Embodiment 8 of the present invention.
Figure 9:
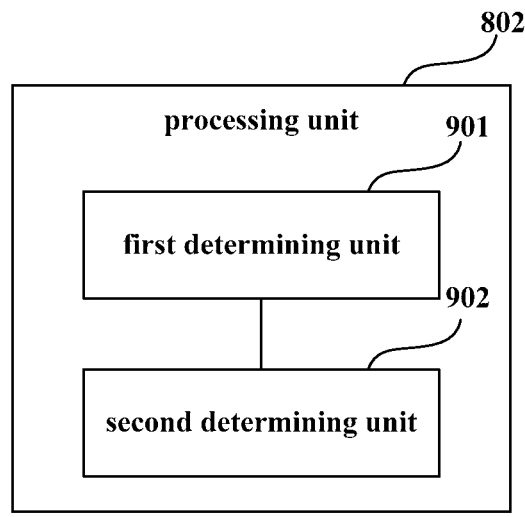
FIGS. 9-11 are schematic diagrams of the structure of a processing unit of Embodiment 8 of the present invention.

FIG. 8 is a schematic diagram of the structure of an apparatus for reporting a connection setup request for D2D of Embodiment 10 of the present invention. At the terminal side, as shown in FIG. 8, the UE 800 includes: an information acquiring unit 801, a processing unit 802 and a request transmitting unit 803; wherein, the information acquiring unit 801 is configured to acquire the configuration information, the configuration information comprising: information on whether the network side supports UE to report a connection setup request for D2D; or information on whether the network side supports the UE to report a connection setup request for D2D and a predetermined time length or a time interval of reporting a connection setup request for D2D and a maximal number of times of reporting the connection setup request for D2D within the time interval; the request transmitting unit 801 is configured to transmit a connection setup request for device-to-device (D2D) communication to a network side when it is determined according to pre-obtained configuration information that the connection setup request for D2D can be transmitted to the network side;

the processing unit 802 is configured to determine according to the configuration information whether the connection setup request for device-to-device (D2D) can be transmitted to the network side;

and the request transmitting unit 803 is configured to transmit a connection setup request for device-to-device (D2D) to a network side when it is determined according to pre-obtained configuration information that the connection setup request for D2D can be transmitted to the network side;

wherein, the processing unit 802 is optional, and is not needed when the UE 800 pre-obtains and stores the configuration information FIG. 9 is a schematic diagram of the structure of the processing unit of Embodiment 8 of the present invention. When the configuration information includes information on whether the network side supports the UE to report a connection setup request for D2D, the processing unit 802 is configured to determine whether the connection setup request for device-to-device (D2D) can be transmitted to the network side according to the configuration information and a reported situation of a connection setup request for D2D.

In such a case, as shown in FIG. 9, the processing unit 802 includes: a first determining unit 901 and a second determining unit 902; wherein, the first determining unit 901 is configured to determine whether the UE has already reported the connection setup request for D2D when the configuration information is that the network side supports the UE to report a connection setup request for D2D; and the second determining unit 902 is configured to determine that the connection setup request for D2D can be transmitted to the network side when the UE has not reported the connection setup request for D2D or the UE has already reported the connection setup request for D2D and a content of the reported connection setup request for D2D is different from that of the connection setup request for D2D to be reported currently.

Figure 10:
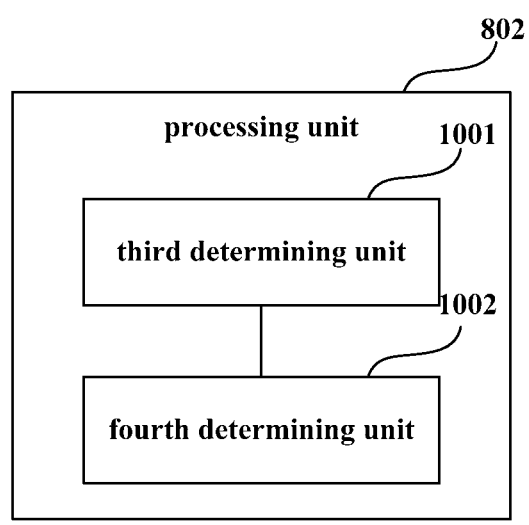

FIG. 10 is a schematic diagram of the structure of the processing unit of Embodiment 8 of the present invention. As shown in FIG. 10, when the configuration information includes information on whether the network side supports the UE to report a connection setup request for D2D and a predetermined time length, the processing unit 802 includes: a third determining unit 1001 and a fourth determining unit 1002; wherein, the third determining unit 1001 is configured to further determine whether a time interval between a current time and a time of the last transmission of the connection setup request exceeds the predetermined time length when it is determined according to the configuration information that the network side supports the UE to report a connection setup request for D2D; and the fourth determining unit 1002 configured to determine that the connection setup request for D2D can be transmitted to the network side when the determination result is that the predetermined time length is exceeded.

In such a case, the apparatus 800 may further include a prohibit timer 805 and an enabling unit 804; wherein, the prohibit timer 805 is configured to mark with "an interval between a current time and a time of last transmission of the connection setup request", and the enabling unit 804 is configured to enable or re-enable the prohibit timer after the connection setup request for D2D is transmitted by the request transmitting unit 803.

Figure 11:
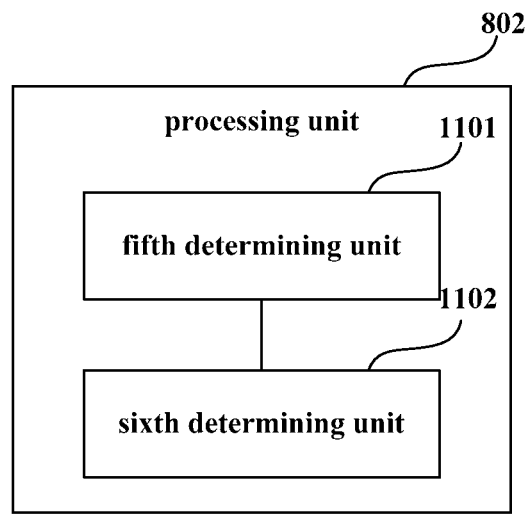

FIG. 11 is a schematic diagram of the structure of the processing unit of Embodiment 8 of the present invention. As shown in FIG. 11, when the configuration information includes information on whether the network side supports the UE to report a connection setup request for D2D, a time interval of reporting a connection setup request for D2D and a maximal number of times of reporting the connection setup request for D2D within the time interval, the processing unit 802 includes: a fifth determining unit 1101 and a sixth determining unit 1102; wherein, the fifth determining unit 1101 is configured to further determine whether the number of times of reporting the connection setup request for D2D within the time interval exceeds the predetermined maximal number of times when it is determined according to the configuration information that the network side supports the UE to report a connection setup request for D2D; and the sixth determining unit 1102 is configured to determine that the connection setup request for D2D can be transmitted to the network side when the determination result is that the maximal number of times is not exceeded.

In the above embodiment, the apparatus 800 may further include a content setting unit (not shown) configured to set a content of the connection setup request for D2D before the connection setup request for D2D is transmitted to the network side.

Embodiment 11 of the present invention provides UE, including the apparatus as described in Embodiment 9 or 10.

In the above embodiment, the UE transmits the connection setup request for D2D only when the UE determines that the connection setup request for D2D can be transmitted to the network side.

Figure 12:
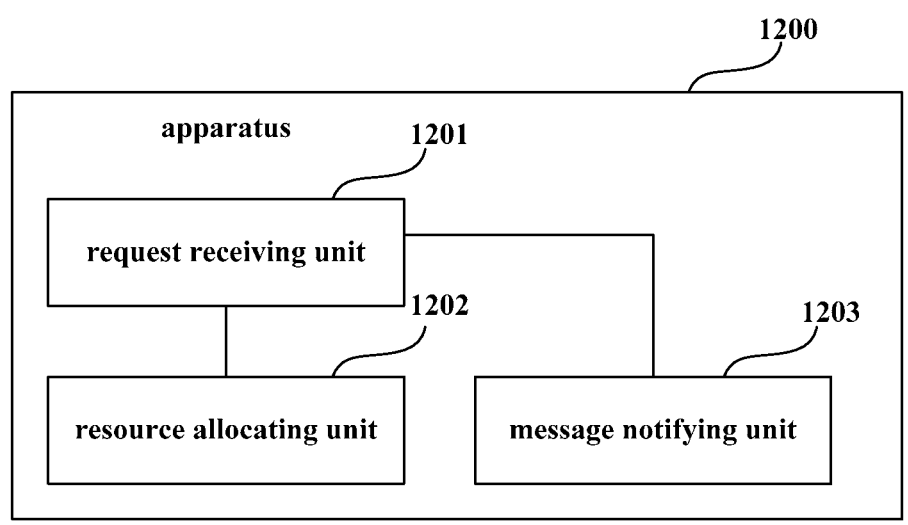
FIG. 12 is a schematic diagram of the structure of an apparatus for reporting a connection setup request for D2D of Embodiment 10 of the present invention.

FIG. 12 is a schematic diagram of the structure of an apparatus for reporting a connection setup request of Embodiment 12 of the present invention. As a network side, as shown in FIG. 12, the apparatus 1200 includes: a request receiving unit 1201, a resource allocating unit 1202 and a notifying unit 1203; wherein, the request receiving unit 1201 is configured to receive a connection setup request for D2D transmitted by UE, the connection setup request for D2D being a connection setup request for D2D that is transmitted when the UE determines according to pre-obtained configuration information that the connection setup request for D2D can be transmitted to the network side;

the resource allocating unit 1202 is configured to allocate a resource for the UE for performing D2D connection when it is determined according a current network state to allocate a resource for the UE for performing D2D connection;

and the notifying unit 1203 is configured to notify the allocated resource to the UE.

In this embodiment, the apparatus 1200 may further include a message notifying unit 1203 configured to notify a connection setup rejection message to the UE when it is determined according the current network state not to support the UE to perform D2D connection; and this unit is optional.

Furthermore, the apparatus 1200 may include an information configuring unit and an information notifying unit (not shown), as described in Embodiment 2, which shall not be describe herein any further.

Embodiment 13 of the present invention further provides an eNB, including the apparatus 1200 as described in Embodiment 12.

Figure 13:
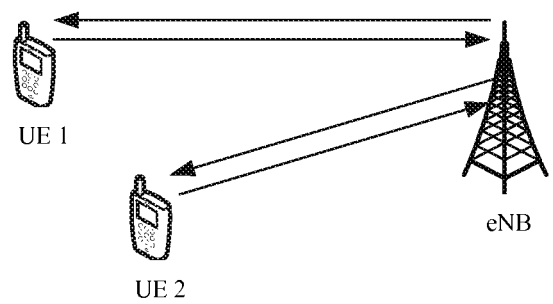
FIG. 13 is a schematic diagram of the structure of a network system of Embodiment 12 of the present invention.

FIG. 13 is a schematic diagram of the structure of a network system of Embodiment 14 of the present invention. As shown in FIG. 13, the system includes: UE, such as UE1 and UE2, and a base station, such as an eNB.

In this embodiment, the structure of the UE is as that of the UE as described in Embodiment 11, and the structure of the eNB is as that of the eNB as described in Embodiment 13, which shall not be describe herein any further.

An embodiment of the present invention further provides a computer-readable program, wherein when the program is executed in an information configuring apparatus, the program enables a computer to carry out the information configuring method as described in Embodiment 1 in the information configuring apparatus.

An embodiment of the present invention further provides a storage medium in which a computer-readable program is stored, wherein the computer-readable program enables a computer to carry out the information configuring method as described in Embodiment 1 in an information configuring apparatus.

An embodiment of the present invention further provides a computer-readable program, wherein when the program is executed in an apparatus for reporting connection setup request or UE, the program enables a computer to carry out the method for reporting connection setup request as described in Embodiment 7 in the apparatus for reporting connection setup request or UE.

An embodiment of the present invention further provides a storage medium in which a computer-readable program is stored, wherein the computer-readable program enables a computer to carry out the method for reporting connection setup request as described in Embodiment 7 in an apparatus for reporting connection setup request or UE.

An embodiment of the present invention further provides a computer-readable program, wherein when the program is executed in an apparatus for reporting connection setup request or an eNB, the program enables a computer to carry out the method for reporting connection setup request as described in Embodiment 8 in the apparatus for reporting connection setup request or the eNB.

An embodiment of the present invention further provides a storage medium in which a computer-readable program is stored, wherein the computer-readable program enables a computer to carry out the method for reporting connection setup request as described in Embodiment 8 in an apparatus for reporting connection setup request or an eNB.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A method for reporting a connection setup request, the method comprising:

determining, according to pre-obtained configuration information, that the connection setup request for device-to-device communication is allowed to be transmitted to a network side and the connection setup request for device-to-device communication has been reported, but the connection setup request for device-to-device communication that has been reported is different from the connection setup request for device-to-device communication to he reported currently:

transmitting the connection setup request for device-to-device communication to a network side, wherein the configuration information comprises information on whether the network side supports a user equipment (UE) to report a connection setup request for device-to-device communication, a time interval of reporting a connection setup request for device-to-device communication and a maximal number of times of reporting the connection setup request for device-to-device communication within the time intervals;

determining whether the number of times of reporting the connection setup request for device-to-device communication within the time, interval exceeds the predetermined maximal number of times when it is determined according to the configuration information that the network side supports the UE to report a connection setup request for device-to-device communication; and determining that the connection setup request for device-to-device communication is allowed to be transmitted to the network side when the determination result is that the maximal number of times is not exceeded.

2. An apparatus for reporting a connection setup request, the apparatus composing:

a memory configured to store a plurality of instructions;

a transmitter; and processor circuitry coupled to the memory, wherein the processor circuitry is configured to:

determine, according to pre-obtained configuration information, that the connection setup request for device-to-device communication is allowed to be transmitted to a network side and the connection setup request for device-to-device communication has been reported, but the connection setup request for device-to-device communication that has been reported is different from the connection setup request for device-to-device communication to be reported currently;

transmit, via the transmitter, the connection setup request for device-to-device communication to a network side, acquire the configuration information, the configuration information comprising information on whether the network side supports a user equipment (UE) to report a connection setup request for device-to-device communication and a time interval of reporting the a connection setup request for device-to-device communication and a maximal number of times of reporting the connection setup request for device-to-device communication within the time interval;

determine whether the number of times of reporting the connection setup request for device-to-device communication within the dine interval exceeds the predetermined maximal number of times when it is determined according to the configuration information that the network side supports the UE to report a connection setup request for device-to-device communication; and determine that the connection setup request for device-to-device communication is allowed to be transmitted to the network side when the determination result is that the maximal number of times is not exceeded.

* * * * *